United States Patent
Leufen et al.

(10) Patent No.: US 8,833,322 B2
(45) Date of Patent: Sep. 16, 2014

(54) HANDHELD WORK APPARATUS HAVING A CONTROL UNIT FOR AN ELECTRIC HEATING ELEMENT

(75) Inventors: Heinrich Leufen, Schwaikheim (DE); Jörg Präger, Winnenden (DE); David Fallscheer, Filderstadt (DE); Rolf Walter, Waiblingen (DE); Michael Link, Ostfildern (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 13/298,383

(22) Filed: Nov. 17, 2011

(65) Prior Publication Data

US 2012/0118254 A1    May 17, 2012

(30) Foreign Application Priority Data

Nov. 17, 2010 (DE) .......................... 10 2010 051 758

(51) Int. Cl.
*B60H 1/03* (2006.01)
*F02M 15/02* (2006.01)
*F02M 15/04* (2006.01)
*F02M 31/135* (2006.01)
*F02B 75/02* (2006.01)
*F02B 63/02* (2006.01)

(52) U.S. Cl.
CPC .............. *F02M 15/04* (2013.01); *Y02T 10/126* (2013.01); *F02M 15/022* (2013.01); *F02M 31/135* (2013.01); *F02B 2075/025* (2013.01); *F02B 63/02* (2013.01)

USPC .............. 123/142.5 R; 123/344; 123/406.55; 30/381; 219/201; 219/202

(58) Field of Classification Search
USPC .............. 123/142.5 R, 344, 406.55; 219/201, 219/202, 204, 213, 238, 535
See application file for complete search history.

(56) References Cited

U.S. PATENT DOCUMENTS

| | | | |
|---|---|---|---|
| 4,816,192 A * | 3/1989 | Abou-Aly et al. ............ | 261/130 |
| 6,232,672 B1 | 5/2001 | Leufen et al. | |
| 6,446,421 B1 * | 9/2002 | Kramer et al. ................... | 56/233 |
| 7,282,676 B1 * | 10/2007 | Bouchier et al. .............. | 219/497 |
| 2003/0178409 A1 * | 9/2003 | Kempf .......................... | 219/494 |
| 2005/0143866 A1 * | 6/2005 | McRae et al. ................. | 700/299 |
| 2008/0036429 A1 * | 2/2008 | Leufen et al. ................... | 322/46 |

* cited by examiner

*Primary Examiner* — Noah Kamen
*Assistant Examiner* — Long T Tran
(74) *Attorney, Agent, or Firm* — Walter Ottesen P.A.

(57) ABSTRACT

A portable work apparatus has a combustion engine for driving a work tool. An air/fuel mixture is supplied to the engine via a carburetor which is provided with an electrical heating element for heating to a given temperature. The heating element is connected to a switch via which electrical energy, which is provided by a generator driven by the engine, is supplied. When a given temperature is exceeded, the switch interrupts the energy supply. To achieve an exact temperature control, the ohmic resistance value of the heating element is stored in a memory in dependence on the temperature. The current flowing through the heating element and the voltage drop at the heating element are measured and the instantaneous resistance of the heating element is calculated therefrom. This calculated value is compared to the value stored in the memory to open or close the switch in dependence on the comparison.

9 Claims, 2 Drawing Sheets

HANDHELD WORK APPARATUS HAVING A CONTROL UNIT FOR AN ELECTRIC HEATING ELEMENT

CROSS REFERENCE TO RELATED APPLICATION

This application claims priority of German patent application no. 10 2010 051 758.5, filed Nov. 17, 2010, the entire content of which is incorporated herein by reference.

FIELD OF THE INVENTION

The invention relates to a handheld work apparatus, in particular a portable handheld work apparatus such as a chain saw, a cut-off machine, a hedge trimmer or the like.

BACKGROUND OF THE INVENTION

U.S. Pat. No. 6,232,672 discloses a handheld work apparatus whose drive motor drives a generator. The generator supplies power for the operation of a heating unit. The generated generator power varies depending on the rotational speed. At low rotational speeds only a small amount of power is available; at high rotational speeds, however, a large amount is available. The heating element is configured in this case such that, at low rotational speeds, sufficient heating can be achieved, in order, for example, in the case of a carburetor heater, to avoid air humidity from the surroundings freezing on the housing of the carburetor. At high rotational speeds, it must be ensured that no overheating of the carburetor takes place because, with a carburetor heater, overheating can lead to the formation of vapor bubbles in the fuel and thus to an unstable operating behavior of the combustion engine.

In order to control the temperature in known heating elements, temperature switches are used such as bimetallic switches, for example. In order to measure the heat in the component to be heated, the temperature switch must, however, be at a certain distance from the heating element itself. As a result, the temperature switch reacts sluggishly. When the heating element is operated with very high power, for example, at full-load of the drive motor, it is not possible to achieve satisfactory temperature control on account of the sluggishness of the temperature measurement. Therefore, in the case of a carburetor heater, disruptions can occur before the temperature switch responds during operation of the heating element with very high power. Furthermore, known temperature switches have a hysteresis which leads to large temperature fluctuations at the heating element itself.

SUMMARY OF THE INVENTION

It is an object of the invention to provide a handheld work apparatus of the generic type such that, with an arranged heating element, precise temperature setting is possible with little technical effort.

The handheld work apparatus of the invention includes: a work tool; a combustion engine configured to drive the work tool; a carburetor; the combustion engine being configured to be supplied with an air/fuel mixture via the carburetor; a handle configured for guiding the work apparatus; a switch; at least one of the handle and the carburetor having an electrical heating element configured to heat to a predetermined temperature; a generator configured to be driven by the combustion engine and generate electrical energy; the heating element being connected to the switch; the generator being configured to supply the electrical energy to the heating element for heating via, the switch; the switch being configured to interrupt the supply of the electrical energy to the heating element when the predetermined temperature is exceeded; a memory unit wherein the ohmic resistance of the heating element as a function of the temperature is stored; a measuring unit configured to measure the current (I) flowing through the heating element to obtain a measured value of the current (I) and to measure the voltage ($U_H$) across the heating element to obtain a measured value of the voltage ($U_H$); a calculating unit configured to calculate the instantaneous ohmic resistance of the heating element from the measured values to obtain a calculated ohmic resistance value; a comparing unit configured to compare the calculated ohmic resistance value to a value of the ohmic resistance stored in the memory; and, the switch being configured to open or close in dependence on the result of the comparison made by the comparing unit.

Initially the temperature characteristic curve of the heating element used is determined precisely and this curve of the ohmic resistance value is saved in a memory unit as a function of the temperature. During operation of the heating element, the current flowing through the heating element and the voltage drop at the heating element are determined in order to determine the current resistance value of the heating element from these values. As soon as the then actual resistance value of the heating element has been determined, the temperature corresponding to the calculated ohmic resistance can be read from the memory unit. Thus, direct information relating to the actual temperature of the heating element is available and can be used to regulate the temperature. Thus, in a simple configuration, the calculated ohmic resistance can be compared to a stored resistance value corresponding to the desired temperature in order to switch the heating element on or off, that is to open or close the switch, depending on the result of the comparison. The comparison of the resistance values corresponds to the read out of the actual temperature corresponding to a calculated resistance value from the memory, in order to then compare this read out, actual temperature with a given desired temperature to which the heater is to be heated.

It may be practical to directly use a given resistance value (which corresponds to a given temperature), starting from which the switch is to be opened. In this case, the resistance value corresponds directly to a temperature value according to the temperature characteristic curve of the ohmic resistance of the heating element.

Expediently, there is provided a control unit which is supplied with the measured values. As a result, the control unit can calculate the then present resistance value and compare it with a given resistance value allocated to a desired temperature. When the resistance value, or the temperature allocated to this resistance value, is reached or exceeded, the switch is opened and no current flows through the heating element.

The switch provided in the heating circuit is preferably an electronic switch, in particular a semiconductor switch such as a TRIAC, a thyristor, a MOSFET or the like.

The then present or instantaneous ohmic value of the heating element is determined from the voltage drop across the heating element and the current flowing through the heating element. Expediently, a shunt resistor is connected to the heating element, preferably in series therewith, in order to determine the current flowing.

An electrical alternating voltage, which is expediently configured as voltage packets having pauses between the voltage packets, is supplied to the heating element via the switch in the heating circuit. A voltage packet begins in the region of a zero crossover and also ends in the region of a zero crossover. This ensures that the switch in the circuit of the heating element is switched in each case at the zero crossover of the alternating voltage, that is, is switched essentially without current. This prevents electromagnetic interference.

If the work apparatus has multiple heating elements, their then present or instantaneous resistances can be calculated in succession, that is, alternately, by only one control unit. Expediently, a priority level is assigned to each of the multiple heating elements, wherein, if necessary, the electrical energy can be supplied first to the heating element having the highest priority level and, in a pause in the energy supply, to the heating element having higher priority, the available energy is supplied to the heating element having the next lower priority level.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
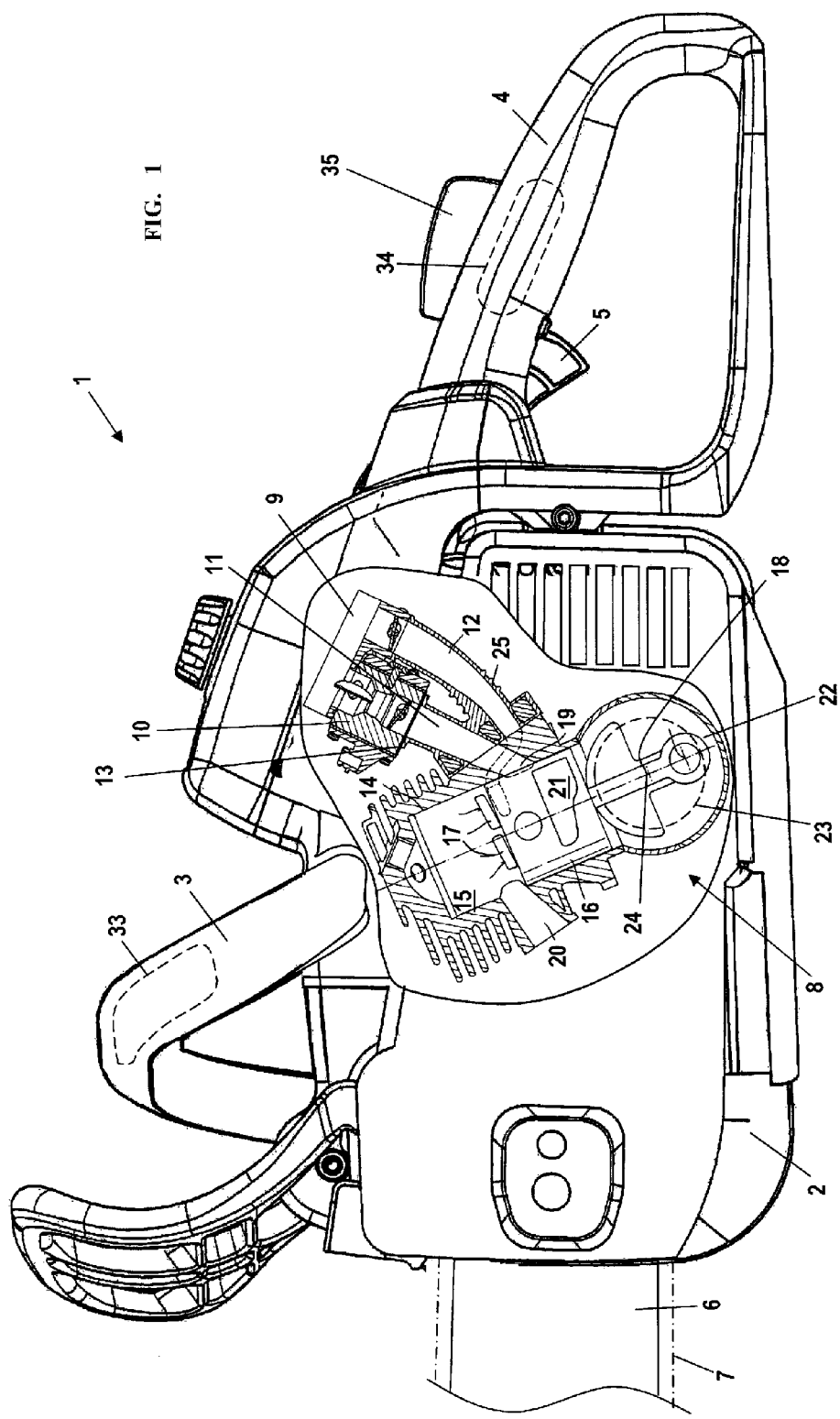
FIG. 1 is a schematic side view of a handheld, portable work apparatus using the example of a chain saw.

The handheld work apparatus shown in FIG. 1 is a portable, handheld work apparatus which is described in the following using the example of a chain saw. The work apparatus can also be configured as a cut-off machine, a hedge trimmer or similar work apparatus.

The work apparatus 1 has a housing 2 in which a combustion engine 8 is arranged. A rear handle 4 which is oriented in the longitudinal direction of the work apparatus 1 is fixed on the housing 2. A bale handle is arranged as a front handle 3 in the front, upper region of the housing 2 and extends over the top side of the housing 2 in an arch which is oriented essentially transversely to the longitudinal direction of the work apparatus 1. From the end of the housing 2 located opposite the rear handle 4, there projects a guide bar 6, on which is guided a saw chain 7 which is driven in a circulating movement by a combustion engine 8. A throttle lever 5 for operating the combustion engine 8 is pivotably mounted on the rear handle 4. A throttle lever lock 35 mounted in the rear handle 4 is assigned to the throttle lever 5.

In the embodiment shown, the combustion engine 8 is configured as a two-stroke engine, especially as a one-cylinder two-stroke engine. The combustion engine 8 has a cylinder 14 in which a combustion chamber 15 is formed. The combustion chamber 15 is delimited by a piston 16. The piston 16 drives a crankshaft 18, which is rotatably mounted in a crankcase 22, in rotation about a rotational axis 24. In the region of bottom dead center of the piston 16 shown in FIG. 1, the crankcase 22 and the combustion chamber 15 are connected to each other via transfer channels 17. The combustion engine 8 has an inlet 19 for an air/fuel mixture into the crankcase 22 and also an outlet 20 via which the exhaust gases are evacuated from the combustion chamber 15. Via an intake channel 11, the combustion engine 8 draws in the air/fuel mixture via a carburetor 10, ahead of which is arranged an air filter 9 via which the combustion air flows in. In addition, a supply channel 12 opens at the air filter 9. The air supply channel 12 opens at the cylinder 14 in the region of the upper piston 16 and communicates in the region of top dead center of the piston 16 with the transfer channels 17 via a piston pocket 21 formed on the piston 16. The combustion engine 8 draws in scavenging air into the transfer channels 17 via the supply channel 12. The intake channel 11 and the supply channel 12 are formed in a common component 25 via which the carburetor 10 is connected to the cylinder 14. Arranged between the carburetor 10 and the stub-like component 25 is an electric heating element 13 which can be fixed on the carburetor 10 and serves to heat the carburetor 10.

During operation, the combustion engine 8 draws in an air/fuel mixture into the crankcase 22 via the intake channel 11, while essentially fuel-free combustion air flows into the transfer channels 17 via the supply channel 12. The air/fuel mixture is compressed in the crankcase 22 during the downward stroke of the piston 16 and thus flows into the combustion chamber 15 via the transfer channels 17 as soon as the transfer channels 17 are opened toward the combustion chamber by the piston 16 traveling to the crankcase 22. The fuel-free air which is pre-stored in the transfer channels 17 separates the fresh air/fuel mixture entering the combustion chamber 15 from the crankcase 22 from the exhaust gases present in the combustion chamber 15, which are discharged via the outlet 20. During the upward stroke of the piston 16, the air/fuel mixture, which has freshly flowed in, is compressed in the combustion chamber 15 and is ignited in the region of top dead center of the piston by a spark plug, not shown. During the downward stroke of the piston 16, the outlet 20 is opened and the exhaust gases flow out of the combustion chamber 15, the exhaust gases being pushed to the outlet by the scavenging air which flows in at the same time via the transfer channels 17.

For the operation of the combustion engine 8, a sufficient amount of fuel must be drawn in via the intake channel 11. At low temperatures, humidity from the ambient air can condense in the carburetor 10 and freeze there. This can impair the functionality of the carburetor 10. The heating element 13 is provided in order to avoid excessively low temperatures at the carburetor 10. The heating element 13 heats the carburetor at low ambient temperatures. However, the heating element 13 must not heat the carburetor 10 so much that vapor bubbles form in the carburetor 10. Vapor bubbles can collect in the fuel system of the carburetor 10, which is configured as a diaphragm carburetor, and thus impair the transport, in particular, the drawing in of further fuel. As a result, the operating behavior of the combustion engine can be impaired.

At low temperatures, not only heating of the carburetor 10 is practical; the handles 3 and 4 provided to guide the work apparatus are also expediently heated by heating elements 33 and 34 so that a person guiding the work apparatus 1 keeps their hands warm while working. This not only serves for comfort but also favors a secure guidance of the work apparatus 1 at low temperatures.

Figure 2:
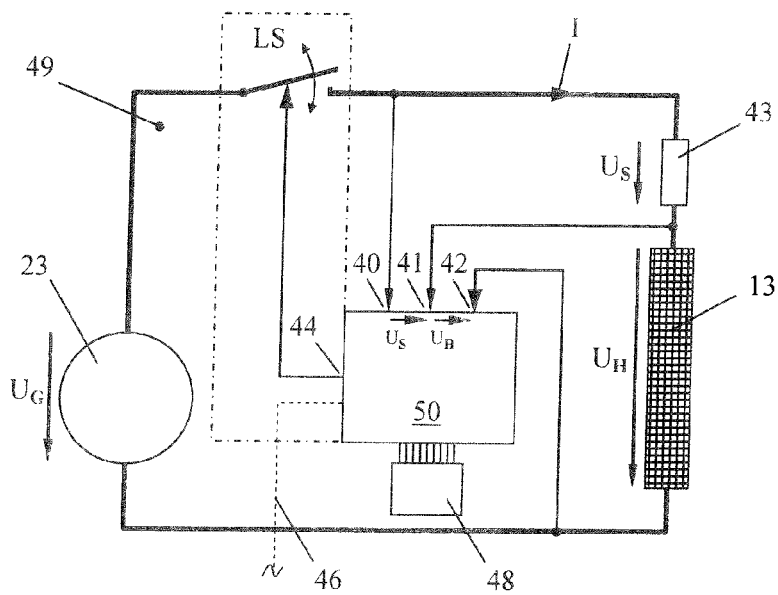
FIG. 2 is a schematic circuit diagram for the energy supply of a heating element.

FIG. 2 schematically shows the circuit for a heating element 13, specifically the heating element for the carburetor 10. The heating element 33 in the front handle 3 and the heating element 34 in the rear handle 4 are operated in the same manner. Thus, a control unit 50, which switches a power switch LS in the circuit of the heating element 13 on or off, can be assigned to each heating element (13, 33, 34). The circuit 49 is supplied by a generator 23 which (see FIG. 1) is driven by the crankshaft 18. The generator voltage $U_G$ in the embodiment shown according to FIG. 2 is applied to the heating element 13 via the power switch LS. The power switch LS is controlled via a control output 44 of the control unit 50, the power switch expediently being an electronic switch, for example a semiconductor switch such as a TRIAC, a thyristor, a MOSFET or similar component. In this case, it is advantageous for the power switch to be integrated into the control unit as indicated with dashed lines in FIG. 2.

The potentials from potential points of the circuit 49 are supplied to the signal inputs 40, 41 and 42 of the control unit 50. In this case, in the embodiment shown, a shunt-resistor 43 is connected ahead of the heating element 13, the potential before and after the shunt-resistor 43 being supplied to the control unit 50 via the inputs 40 and 41. The control unit 50 can thus tap the voltage $U_S$ drop, and at the shunt-resistor 43 between the signal inputs 40 and 41, the current I flowing through the circuit 49 can be directly calculated therefrom. The shunt-resistor 43 can, like the power switch LS, be integrated into the control unit 50, so that only the generator 23 is to be connected at the input end of the control unit 50 and only the heating element 13 is to be connected at the output end of the control unit 50. Further wiring is not needed.

The potential is supplied to the signal input 42 after the heating element 13, so that the control unit 50 can tap the voltage drop $U_H$ at the heating element 13 between the signal inputs 41 and 42. Via the potentials in the circuit 49 tapped at the signal inputs 40 to 42, the control unit permanently has the current current I and the current voltage drop $U_H$ at the heating element 13 available. From these two values, the current resistance of the heating element 13 can be calculated directly according to the ohmic rule.

A memory unit 48, in which the ohmic resistance of the heating element 13 in dependence on the temperature is stored, is connected to the control unit 50. When the control unit 50 has calculated a current resistance value of the heating element 13, the temperature associated with the calculated current resistance value of the heating element 13 is read out from the memory 48. This read out temperature value corresponds to the current ohmic resistance of the heating element 13 and is compared to a temperature specified by the control unit 50 in order to open or close the switch LS depending on the result of the comparison. This occurs in such a manner, that when the temperature provided is reached or exceeded by the temperature value read out from the memory 48, the switch LS is opened in order to prevent a further heating of the heating element 13.

After the switch LS has been opened the control unit 50—expediently in given time intervals—closes the switch LS for a short period of time for measurement purposes, as a result of which corresponding measurement potentials are set at the signal inputs 40, 41 and 42. From these measured potentials, the current resistance value of the heating element 13 is determined anew, the associated temperature value from the memory 48 is read out and the power switch LS is then switched on again for a further heating period when the temperature value read out is below the temperature value specified by the control unit 50. The short closing pulses for measurement purposes which occur after the switching off of the heating circuit by opening the power switch LS serve only for checking the then present resistance value; the closing pulses have such a time span that the closing of the power switch in intervals for measuring the current or instantaneous resistance value of the heating element 13 does not cause a significant energy input into the heating element 13, so that a temperature increase as a result of the closing at intervals for measuring the current resistance value is negligible.

Figure 3:
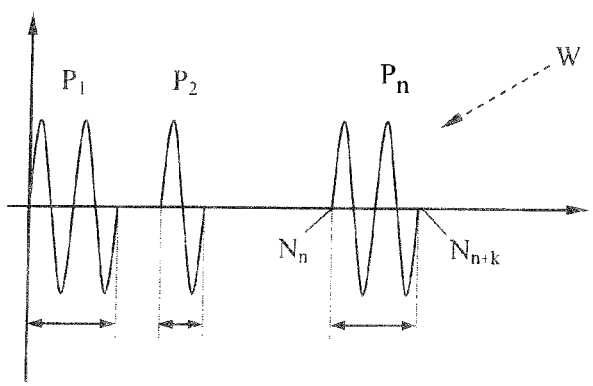
FIG. 3 is an illustration of the energy packet supplied to the heating element; and, FIG. 4 is a schematic illustration of possible priority control.

An electrical alternating voltage $U_G$, which is generated by the generator 23, is supplied to the heating element 13 via the power switch LS. In this case—as FIG. 3 shows—the alternating voltage is expediently supplied to the heating element 13 as voltage packets $P_1$, $P_2$, $P_n$, between which there can be smaller or larger pauses. The configuration of a voltage packet is done in such a manner that a voltage packet $P_n$ begins in the region of the zero crossover $N_n$ and ends in the region of a subsequent, later zero crossover $N_{n+k}$. The result of this is that the switch LS switches essentially at the zero crossover of the alternating voltage W, so that, at the time of switching, no current flows and thus electromagnetic switch interference can for the most part be excluded.

As shown in FIG. 1, the work apparatus 1 has multiple heating elements (13, 33, 34), to which, according to an embodiment of the invention, the generator voltage $U_G$ is purposefully applied alternately. As a result, the full generator voltage can be supplied to a single heating element and can provide for quick heating up, which is particularly advantageous for the operation of the combustion engine with regard to the heating element 13 of the carburetor 10. In this case, a circuit according to FIG. 2 can be assigned to each heating element (13, 33, 34), wherein the circuits 49 should be connected to the connection terminals of the generator 23 in parallel. The control units 50 can communicate with each other via a communications terminal 46 and cause that always only one control unit 50 switches on a circuit of a heating element (13, 33, 34). Thus, it can be ensured that while the current is applied to a heating element, for example heating element 13, the other heating elements, for example heating elements (33, 34), remain without current because their control units keep the power switch LS open.

It can also be practical to configure a single control unit 50 in such a manner that multiple heating elements 13 and multiple power switches LS can be controlled therewith.

Figure 4:
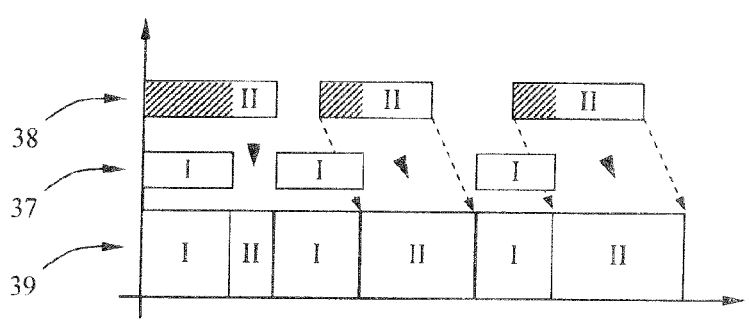

In a further embodiment of the invention, priority levels are assigned to the heating elements (13, 33, 34). Thus, for example, the heating element 13 of the carburetor 10 can be assigned the priority level I, while the heating element 34 in the rear handle 4 is assigned the priority level II and the heating element 33 in the front handle 33 is assigned the priority level III. If the control units 50—or a common control unit—detect a need for heating at multiple heating elements (13, 33, 34) at the same time, the electrical energy provided by the generator 23 is first supplied to the heating element having the highest priority level, thus, for example, the heating element 13 of the carburetor 10. If the heating requirement at the carburetor 10 is covered, the power switch LS in the corresponding circuit is opened and, in this heating pause that then occurs, the energy provided by the generator 23 is supplied to the heating element having the next lower priority level, in the exemplary embodiment the heating element 34 having the priority level II. If the heating requirement has been covered there, the next priority level III is served, namely the heating element 33 in the front bale handle 3. This type of priority control is reproduced schematically in FIG. 4.

In the middle row 37, the heating requirement of a heating element having the priority I is shown; in the row 38 shown thereabove, the heating requirement of a heating element having the priority II is illustrated.

As can be seen from the bottom row 39, the energy provided by the generator 23 is supplied to the heating element having the priority I for as long as the associated control unit 50 demands it. If the control unit 50 of the heating element having the priority I opens the power switch, this results in a pause in which the control unit for the heating element having the priority II immediately closes the associated power switch so that the energy provided by the generator 23 is now supplied to the heating element having the priority II if heating energy is needed there. If the heating element having the priority I again demands an energy supply, the power switch to the heating element having the priority II is immediately opened and all the energy is again supplied to the heating element having the priority I, that is, the power switch LS of the control unit 50 is closed.

For temperature control, it is sufficient to compare the calculated instantaneous resistance value with a given resistance value which corresponds to the desired given temperature to which the heating element is to heat up. Likewise, an illustration of the ohmic resistance of the heating element in dependence on the temperature can be derived from current/voltage curves. Ultimately, the physical relationship $$R(T) = U_H/I$$

can be used in all technically possible variations in order to carry out the idea of the invention.

It is understood that the foregoing description is that of the preferred embodiments of the invention and that various changes and modifications may be made thereto without departing from the spirit and scope of the invention as defined in the appended claims.

What is claimed is:

1. A method for controlling a heating element in a handheld work apparatus including a work tool; a combustion engine for driving said work tool; a carburetor; said combustion engine being configured to be supplied with an air/fuel mixture via said carburetor to operate said combustion engine; a handle configured for guiding said work apparatus; a switch; at least one of said handle and said carburetor having an electrical heating element configured to heat said at least one of said handle and said carburetor to a predetermined temperature; a generator configured to be driven by said combustion engine and generate electrical energy; said heating element being part of a current loop connected to said switch; said generator being configured to supply said electrical energy to said heating element for heating via said switch; a control unit for switching said switch in said current loop of said heating element; said control unit being configured to open said switch to interrupt the supply of said electrical energy to said heating element when said predetermined temperature is exceeded; and, a memory unit wherein the ohmic resistance of the heating element as a function of the temperature is stored; the method comprising the steps of:

measuring the current (I) flowing through said heating element to obtain a measured value of said current (I) and measuring the voltage ($U_H$) across said heating element to obtain a measured value of said voltage ($U_H$);

calculating the instantaneous ohmic resistance of said heating element from said measured values to obtain a calculated instantaneous ohmic resistance value;

comparing said calculated instantaneous ohmic resistance value to a value of said ohmic resistance stored in said memory unit; and, causing said control unit to open or close said switch in dependence on the result of said comparison.

2. The method of claim 1, wherein said control unit opens or closes said switch in such a manner that said control unit opens said switch when said temperature value read out of said memory unit is reached or exceeded.

3. The method of claim 1, wherein the current (I) is determined via a shunt resistor.

4. The method of claim 1, wherein said heating element is supplied with an electrical alternating voltage via said switch.

5. The method of claim 4, wherein the electrical energy of said alternating voltage is supplied as voltage packets having pauses between said packets.

6. The method of claim 5, wherein one of said voltage packets starts in the region of a zero crossover ($N_n$) and ends in the region of a zero crossover ($N_{n+k}$).

7. The method of claim 1, wherein said heating element is supplied with an electrical alternating voltage via said switch; and, said switch is configured to switch at a zero crossover of said alternating voltage.

8. The method of claim 1, wherein said work apparatus has multiple heating elements having respective values of resistance which are calculated in sequence.

9. The method of claim 8, wherein said multiple heating elements have respective priority levels assigned thereto; said electrical energy is first applied to the one of said multiple heating elements having the highest priority level as required; and, during a pause in the supply of said electrical energy to said one of said multiple heating elements, said electrical energy is supplied to the one of said multiple heating elements having the next highest priority.

* * * * *